United States Patent [19]

Becker et al.

[11] E Patent Number: Re. 32,389

[45] Reissued Date of Patent: Apr. 7, 1987

[54] METHOD OF PRODUCING A LINED STRUCTURE

[75] Inventors: James R. Becker; Edward L. Raymond, both of Houston, Tex.; David W. Cameron, Allegany, N.Y.

[73] Assignee: Cameron Iron Works, Inc., Houston, Tex.

[21] Appl. No.: 714,156

[22] Filed: Mar. 20, 1985

Related U.S. Patent Documents

Reissue of:

[64] Patent No.: 4,477,955
Issued: Oct. 23, 1984
Appl. No.: 393,055
Filed: Jun. 28, 1982

U.S. Applications:

[63] Continuation-in-part of Ser. No. 138,874, Apr. 10, 1980, abandoned.

[51] Int. Cl.[4] ..... B21D 53/00; B21K 29/00; B23P 15/26

[52] U.S. Cl. ..... 29/157.1 R; 29/DIG. 31; 419/8; 419/48; 419/49

[58] Field of Search ..... 29/157.1 R, 420, DIG. 31; 419/8, 48, 49; 137/375; 251/366

[56] References Cited

U.S. PATENT DOCUMENTS

| | | | |
|---|---|---|---|
| 1,303,102 | 5/1919 | Monrath | 251/366 |
| 3,093,864 | 6/1963 | Waldron et al. | 29/157.1 R UX |
| 3,217,739 | 11/1965 | La Valley et al. | 137/375 |
| 3,271,845 | 1/1962 | Brehen | 29/157.1 R |
| 3,334,650 | 8/1967 | Lowery et al. | 137/375 |
| 3,340,053 | 9/1967 | Hodge et al. | 75/214 |
| 3,459,213 | 8/1969 | Schenck, Jr. et al. | 137/375 X |
| 3,773,506 | 11/1973 | Larker et al. | 29/156.8 B X |
| 3,992,202 | 11/1976 | Dulis et al. | 419/49 X |
| 3,996,048 | 12/1976 | Fiedler | 419/49 X |
| 4,065,302 | 12/1977 | Turillon | 419/49 X |
| 4,077,109 | 3/1978 | Larson | 419/49 |
| 4,094,709 | 6/1978 | Rozmus | 419/49 X |
| 4,135,286 | 1/1979 | Wright et al. | 204/298 X |
| 4,137,619 | 2/1979 | Beltran et al. | 29/420.5 |
| 4,142,888 | 3/1979 | Rozmus | 419/49 |
| 4,161,187 | 7/1979 | Bauer | 29/447 X |
| 4,261,745 | 4/1981 | Watanabe et al. | 75/208 R |
| 4,356,612 | 11/1982 | Becker et al. | 29/157.1 R |

FOREIGN PATENT DOCUMENTS

| | | | |
|---|---|---|---|
| 1458291 | 12/1968 | Fed. Rep. of Germany | 419/8 |
| 2349776 | 5/1974 | Fed. Rep. of Germany | 419/49 |
| 2648729 | 5/1978 | Fed. Rep. of Germany | 164/98 |
| 1009577 | 11/1965 | United Kingdom | 29/157.1 C |

OTHER PUBLICATIONS

Brae Field Development Block 16/7a, Marathon Oil, U.K., Ltd., a study by Cameron Iron Works, Inc., Houston, Texas (Nov. 1980).

Cam Clad Valve, Cameron Iron Works, Inc., Houston, Texas (Aug. 1980).

*Primary Examiner*—Howard N. Goldberg
*Assistant Examiner*—Ronald S. Wallace
*Attorney, Agent, or Firm*—Vinson & Elkins

[57] ABSTRACT

The method of forming a lining in the cavities of a body by application of powdered metal consolidated and bonded thereon by a hot isostatic pressing process. A space lining the cavities in the body is provided by tubular members, one intersecting with the other or in close spaced relation thereto, powdered metal fills the space, a vacuum is drawn on the space, the body is subjected to forming conditions and then the body cavities are machined to their final shape with such machining generally removing the tubular members.

15 Claims, 4 Drawing Figures

FIG. 2
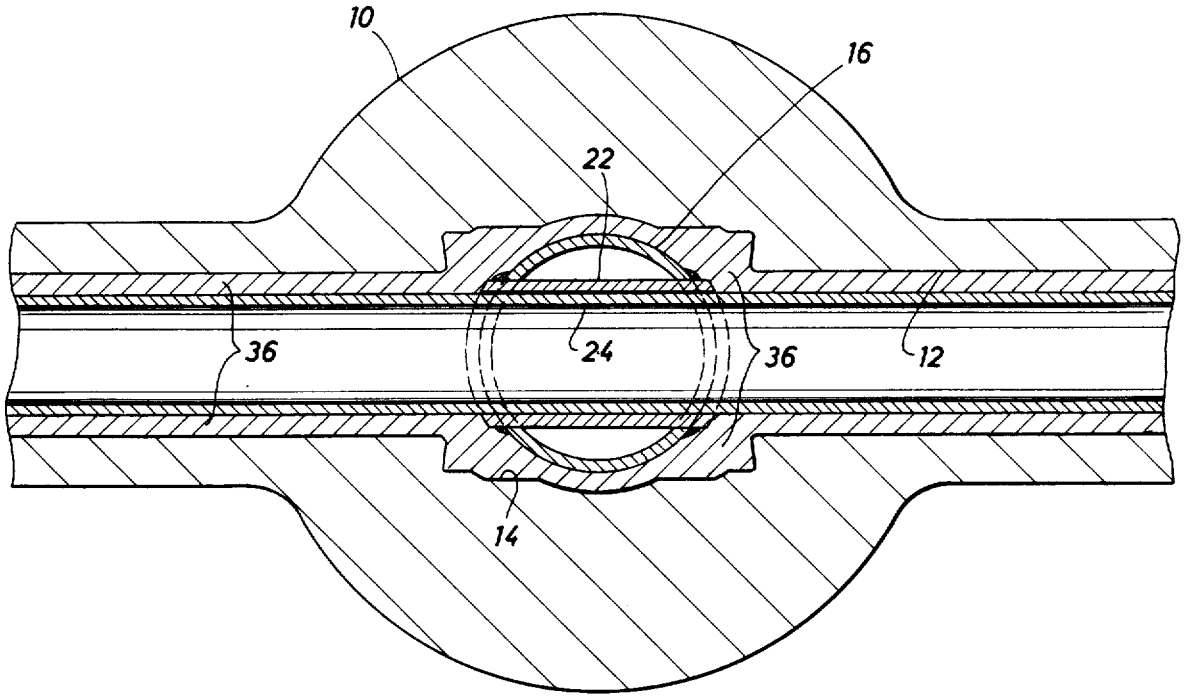
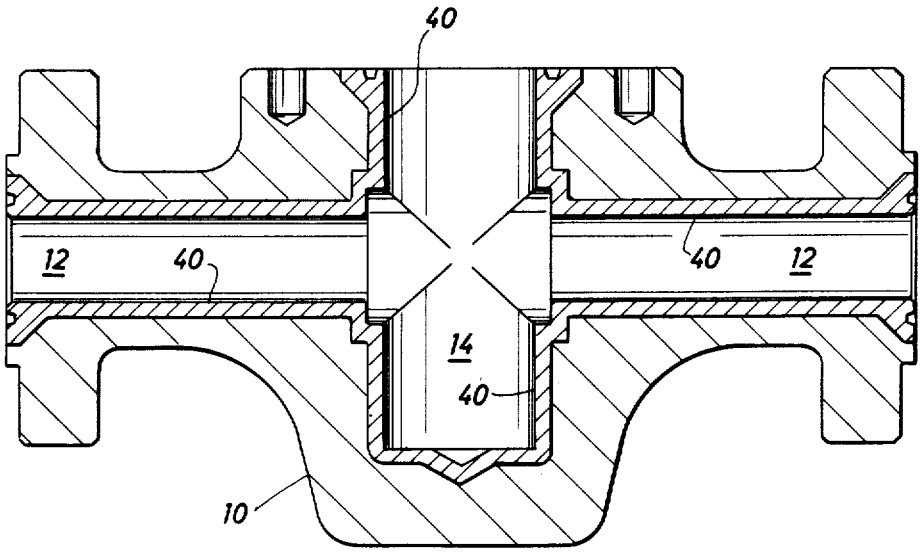
FIG. 3

METHOD OF PRODUCING A LINED STRUCTURE

Matter enclosed in heavy brackets [ ] appears in the original patent but forms no part of this reissue specification; matter printed in italics indicates the additions made by reissue.

CROSS REFERENCE TO RELATED APPLICATION

The present application is a continuation-in-part application of our prior copending application Ser. No. 138,874, filed Apr. 10, 1980, now abandoned.

BACKGROUND

There is a need for a high strength structure with corrosion resistant internal metal surfaces as, for example, a gate valve installed in a line containing corrosive fluids under high pressure. Such a valve could be made of AISI 4130 steel and have an interior (valve chamber and passages) lined with a 300 Series stainless steel.

Many attempts have been made to provide such structures. U.S. Pat. Nos. 3,349,789 and 2,497,780 each provide valves with liners which must be secured and sealed in the flow passages but no provisions are made to line the valve chambers.

Products have been made by the hot isostatic pressure process by creating a space which is filled with powdered metal and surrounded with a flexible material which can maintain a seal under the forming temperature and pressure. The powdered metal when subjected to the heat and pressure becomes consolidated into the desired shape. The prior art methods have been devoted to forming solid structures or coating the exterior of a structure. Other examples of prior art may be found in U.S. Pat. Nos. 3,631,583, 3,992,202 and 4,142,888, but such prior art does not disclose any method of using the hot isostatic pressing process to form a lining within cavities of a structure such as, for example, a valve body or a blowout preventer body.

SUMMARY

The present invention relates to an improved hot isostatic pressing method of lining the cavities of a body. Hot isostatic pressing (HIP) is well known in the art and is described, for example, in Chapter 9 of the "Powder Metallurgy Equipment Manual" of the Powder Metallurgy Equipment Association, 2nd Ed. 1977. The method includes the steps of establishing a space within the body cavities bounded by the cavity walls and a yieldable mold; filling the space with a powdered metal, drawing a vacuum on the space, and subjecting the body to forming temperature and pressure whereby a lining of the consolidated powderd metal is formed with the body cavity.

An object of the present invention is to provide an improved method of producing a body with lined cavities.

Another object is to provide an improved method of manufacturing a high strength alloy steel pressure containing structure having corrosion resistant material lining the interior surfaces of the structure.

A further object is to provide an improved method of lining cavities in a metal structure with metal consolidated by the hot isostatic pressing process.

Still another object is to provide an improved method of lining intersecting cavities within a metal structure.

BRIEF DESCRIPTION OF THE DRAWINGS

These and other objects and advantages of the present invention are hereinafter set forth and explained with reference to the drawings wherein:

FIG. 2 is a partial sectional view taken along line 2—2 in FIG. 1.

FIG. 3 is a cross-sectional view of the completed structure showing the finished structure with the consolidated metal lining after machining.

DESCRIPTION OF THE PREFERRED EMBODIMENTS

Figure 1:
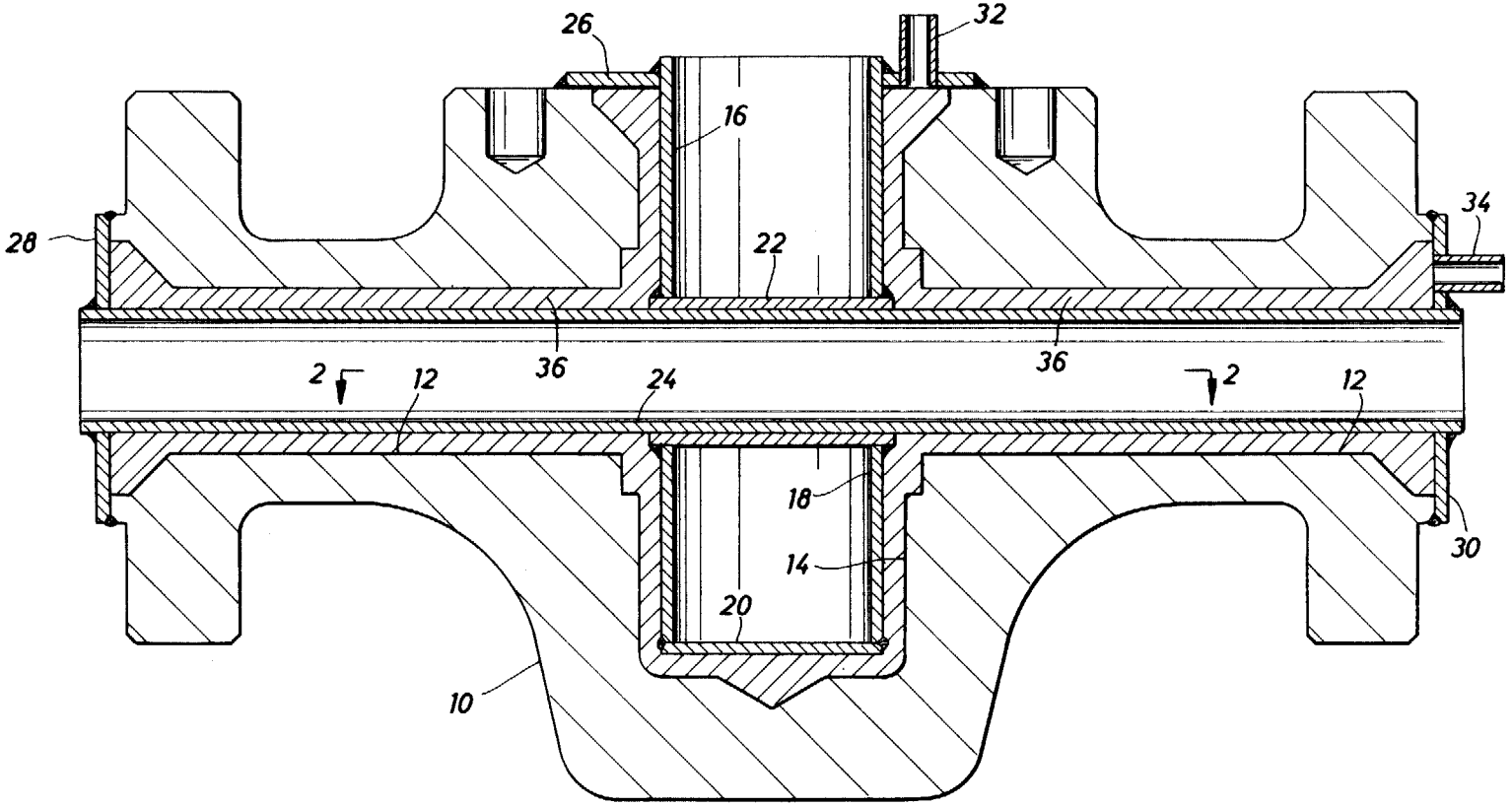
FIG. 1 is a cross-sectional view of a valve body illustrating the structure used to provide the space within the cavities of the valve body.

Valve body 10, shown in FIG. 1, is an alloy steel structure having cavities including flow passages 12 and valve chamber 14 which are to be provided with a corrosion resistant lining.

To prepare for the addition of metal powder, can 16, having thin tube 18, flat bottom 20 and thin sleeve 22 extending through the intermediate portion of tube 18 is inserted into valve chamber 14. Bottom 20 is sealed to the end of tube 18 as by welding and sleeve 22 is also sealed to tube 18 as by welding. Thin tube 24 is inserted through passages 12 and sleeve 22 as shown. Ring 26 is welded to the exterior of can 16 and to the exterior of body 10 as shown and rings 28 and 30 are welded around the ends of tube 24 and to the exterior of body 10. Fill tube 32 extends through ring 26 and fill tube 34 extends through ring 30. The structure of can 16, tube 24 and their sealing rings 26, 28 and 30 provides a space 36 within the walls of passages 12 and chamber 14. This structure functions as a pressure transmitting yieldable mold or thin metal sealed structure as hereinafter explained. It is important that all of the welds in the structure of can 16, sleeve 22 and tube 24 be air tight and remain so during the consolidation step to exclude air from the heated metal powder.

Space 26 within body cavities 12 and 14 is then filled through fill tubes 32 and 34 with a suitable metal powder, such as 316 stainless steel. It is recommended that body 10 be vibrated during filling of space 36 so that it is completely filled with the metal powder before proceeding to the next step. It is preferred that the material of can 16, tube 24 and rings 26, 28 and 30 be similar to the material used for the lining. Also, it is suggested that space be sufficiently large to provide a lining of consolidated metal which is sufficiently thick to allow for machining to the final shape without any depressions or holidays in the finished lining. When the same material is used for can 16 and tube 24, a portion of the finished lining may be the material of can 16 and tube 24.

When space 36 is completely filled, a vacuum is drawn thereon by connection of suitable means such as a vacuum pump (not shown) to either or both of fill tubes 32 and 34. Sufficient vacuum should be drawn so that the amount of gases present in space 36 will not interfere with the formation of a suitable consolidated metal lining. When the desired vacuum is reached fill tubes 32 and 34 are closed and sealed. If desired, suitable valves (not shown) may be secured thereon so that they may be closed when the vacuum drawing step is finished. Such valves are recommended to be leak proof when subjected to forming conditions.

Thereafter, body 10 is placed in an autoclave (not shown) or other suitable device wherein it is subjected to forming temperature (2100° F. approximately and pressure (15,000 psi approximately). The body 10 is retained in such forming condition for several hours and then it is allowed to cool.

During exposure to forming conditions in the autoclave, can 16 and tube 24, being yieldable, are expanded to compress the powdered metal against the walls of passages 12 and chamber 14. The heat and pressure thus cause the metal to be consolidated into a solid lining within the body which is completely bonded to the walls of passages 12 and chamber 14. If can 16 and tube 24 are made of the same material as the lining, they will be integral with the lining and may form a part of the final product.

The cooled body 10 is heat treated as required to obtain the desired mechanical properties and then machined to the shape shown in FIG. 3. It then has a uniform smooth corrosion resistant lining 40 on the walls of passages 12 and chamber 14. If can 16 and tube 24 are made of a different material from the lining, they will preferably be entirely removed during the machining step.

Figure 4:
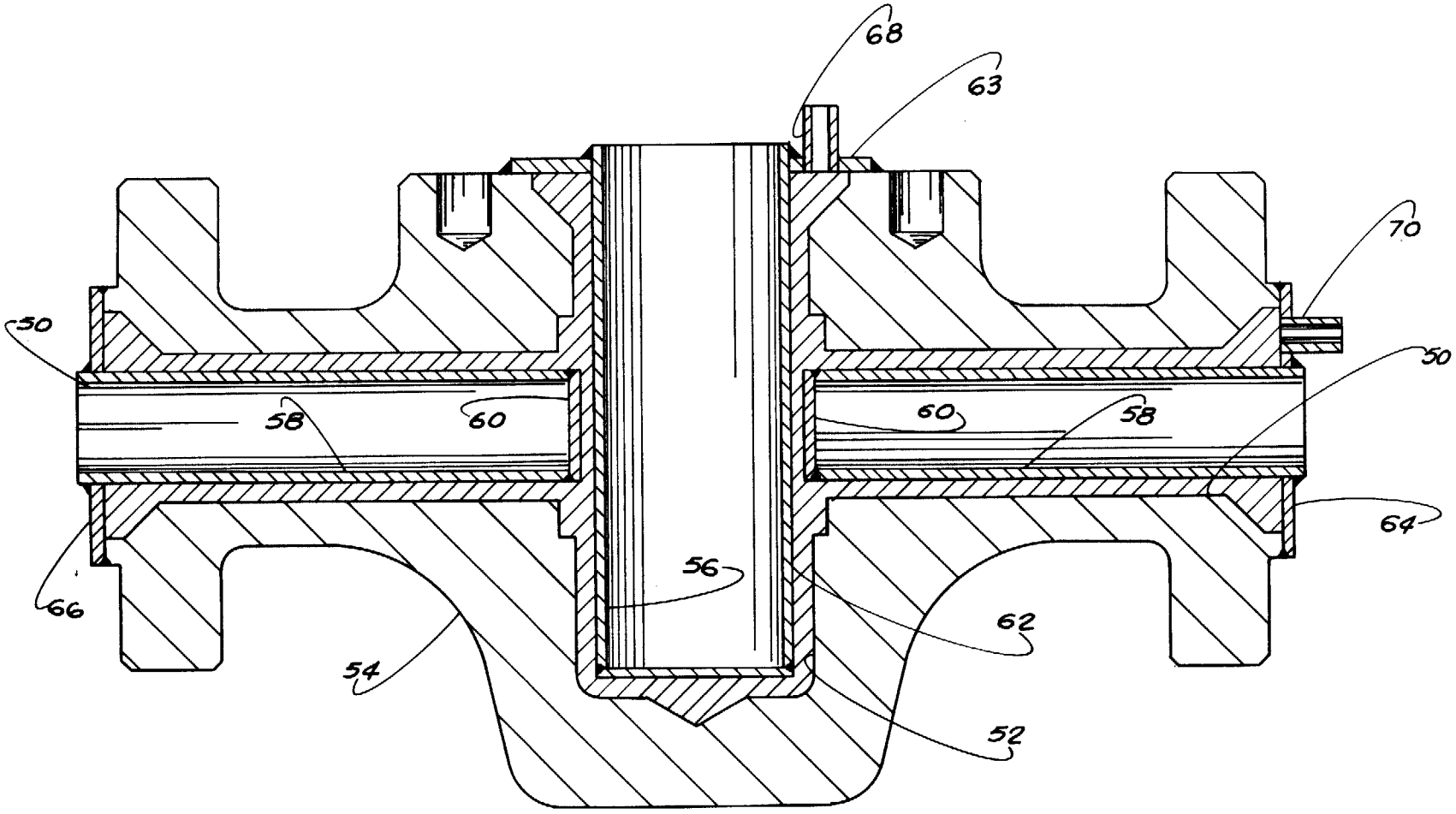
FIG. 4 is a cross-sectional view of a valve body illustrating a modified structure used to provide the space within the cavities of the valve body.

The modified structure shown in FIG. 4 is positioned in the flow passages 50 and valve chamber 52 of valve body 54 and includes can 56 positioned within valve chamber 52 and spaced from the walls thereof and cans 58 positioned in flow passages 50 and spaced from the walls of such passages. Cans 58 also have their bottoms 60 spaced a sufficient distance from the sidewall 62 of can 56 so that during the forming steps none of the cans interfere with the desired movement of any of the other cans. As shown, each of cans 56 and 58 has a bottom welded to its tubular portion as hereinbefore described with respect to can 16 in FIG. 1. Also, cans 56 and 58 (and can 16) may be single piece, deep drawn, structure keeping in mind that they are to remain air tight during the consolidation step. Ring 63 is welded around the portion of can 56 extending out of valve body 54 and is welded around its outer periphery to the exterior of valve body 54 as shown. Rings 64 and 66 are welded around the portions of cans 58 extending from body 54 and are also welded around their outer peripheries to the exterior of body 54 as shown. Fill tube 68 extends through ring 63 to communicate with the space between the exterior of cans 56 and 58 and the interior of body 54. Fill tube 70 extends through ring 64 in a similar manner.

The operation of lining the cavities of valve body 54 are as described above with respect to valve body 10. It is important that cans 56 and 58 be supported in a position to be spaced substantially uniformly from the walls of flow passages 50 and valve chamber 52 so that a substantially uniform thickness of condensed metal is provided on such internal surfaces.

It is suggested that the walls to be lined by the method of the present invention be nickel plated as preparation for the forming of a lining by the method of the present invention. It is believed that the nickel plating prevents oxidation, helps obtain bond continuity and prevents the chrome in the metal powder from migrating into the alloy and forming an undesired martensitic structure.

It is contemplated that the method of the present invention may be used to provide linings of nickel, nickel alloys, tantalum, Hastelloy alloys, copper, copper alloys, cobalt base alloys, stainless steel and titanium alloys and carbides bonded to a body of various grades of alloy steel, carbon steel or stainless steels.

The method of the present invention provides a lining on the walls of intersecting bores or cavities in a thick-walled pressure vessel by using the pressure vessel as the base metal to accept the hot isostatic pressed metal powder. The structure shown and described is an alloy steel valve body lined with stainless steel. The method may be used to line the bore and guideways of a blow-out preventer body by using two stainless steel tubes as the mold around the space in which the metal powder is placed in place of the tube and can described.

The formation conditions (temperature, pressure, time and degree of vacuum) are well known and should be adjusted to the particular materials being used.

What is claimed is:

1. The method of lining a body having a plurality of intersecting cavities including the steps of nickel plating the walls of said cavities, securing and sealing a thin hollow metal sealed structure within the intersecting body cavities in spaced relation to the walls of the cavities to provide an interconnected sealed space between said structure and the walls of said cavities with at least a portion of the thin hollow metal sealed structure blocking the intersecting body cavities, filling said interconnected sealed space with metal powder, evacuating gas from said interconnected sealed space, subjecting the body with the sealed structure and metal powder therein to a temperature of approximately 2100° F. and a pressure of approximately 15,000 psi for a period of approximately two hours, to consolidate the metal powder into a dense uniform interconnected lining in said cavities, cooling the lined body, and machining the lined cavities to the desired dimensions and to remove the portion of the thin hollow metal sealed structure blocking communication between the body cavities.

2. The method according to claim 1 wherein said machining step removes the thin metal sealed structure from the interior of the lined cavities.

3. The method of applying a corrosion resistant lining to intersecting passages of a high strength pressure vessel comprising nickel plating said intersecting passages, securing and sealing a thin hollow yieldable metal mold in spaced relationship to the passages to be lined to provide an interconnected sealed space lining said passages with at least a portion of said thin hollow metal mold blocking the intersecting passages, filling the space between the passages and the mold with metal powder, drawing a vacuum in the space, subjecting the mold, metal powder and pressure vessel to elevated temperature and pressure sufficient to consolidate the metal powder into a dense uniform interconnected metal lining in the passages, and machining the [consolidated metal powder] *material in the lined passages* to remove the portion of said thin hollow metal mold blocking communication between said passages.

4. The method according to claim [6] *3* wherein said vessel is a high strength alloy steel and said lining is a stainless steel.

5. The method of producing a lined valve structure from a body having a chamber and flow passages connected therewith including the steps of machining the walls of the chamber and the flow passages over-sized in a valve body, nickel plating the machined walls of the chamber and the flow passages, inserting a stainless steel can into the chamber, said can being sized to be spaced from the machined, nickel-plated walls of the chamber, said can having a sleeve extending through and sealed to the sidewall of said can, inserting a stainless steel tube into the body flow passages and through the sleeve, said sleeve being spaced from the machined, nickel-plated walls of the flow passages, securing end closure rings around the open ends of said can and said stainless steel tube, securing said end closure rings to the exterior of said valve body to ensure that said can and said sleeve are spaced uniformly from the machined walls of the body, one of said closure rings having a fill tube extending therethrough, flowing a stainless steel metal powder through said fill tube into the space in said cavity and passages surrounding said can and said tube, vibrating said valve body to ensure complete filling of the space with the metal powder, withdrawing gas from said space to reduce the pressure therein, closing and sealing the fill tube, heating the body, can, sleeve and metal powder under forming pressure to forming temperature in an autoclave, maintaining the temperature and pressure in the autoclave for sufficient time to cause the metal powder to be consolidated into a lining, allowing the lined body to cool, and machining the lined chamber and passages both to their desired dimension and to provide communication between the interiors of said stainless steel can and said stainless steel tube.

6. The method of producing a lined valve structure from a body having a chamber and flow passages connected therewith including the steps of machining the walls of the chamber and flow passages over-sized in a valve body, nickel plating the machined walls of the chamber and the flow passages, inserting a stainless steel can into the chamber, said can being sized to be spaced from the machined, nickel-plated walls of the chamber, inserting a can into the body flow passages, said can being sized to be spaced from the machined, nickel-plated walls of the flow passages and from the can in the chamber, securing end closure rings around the open ends of said cans, securing said end closure rings to the exterior of said valve body to ensure that said cans are spaced uniformly from the machined walls of the body, one of said closure rings having a fill tube extending therethrough, flowing a stainless steel metal powder through said fill tube into the space in said cavity and passages surrounding said cans, vibrating said valve body to ensure complete filling of the space with the metal powder, withdrawing gas from said space to reduce the pressure therein, closing and sealing the fill tube, heating the body, cans, and the metal powder under forming pressure to forming temperature in an autoclave, maintaining the temperature and pressure in the autoclave for sufficient time to cause the metal powder to be consolidated into a lining, allowing the lined body to cool, and machining the lined chamber and passages both to their desired dimensions and to provide communication between the interiors of said cans.

7. The method of lining a body having a plurality of intersecting cavities including the steps of positioning a thin hollow metal structure within each of said cavities of said body in spaced relation to the walls of said cavities with at least a portion of said thin hollow metal structure blocking the intersection of the body cavities, securing said thin hollow metal structure to said body within each of said cavities to provide an interconnected space within said cavities, filling said space with metal powder, evacuating gas from said space, subjecting said body, said structures, and said powder to elevated temperature and pressure sufficient to consolidate the metal powder into a dense uniform interconnected metal lining said cavities, removing excess material and the portion of the thin hollow metal structure blocking the intersection of the body cavities to complete the desired lined intersecting cavities and to provide communication therebetween.

8. The method of lining a body having a plurality of intersecting cavities including the steps of positioning a thin hollow metal can within each of said cavities of said body in spaced relation to the walls of said cavities with at least a portion of one can blocking the intersection of the body cavities, securing said can to said body within each of said cavities to provide an interconnected space within said cavities, filling said space with metal powder, evacuating gas from said space, subjecting said body, the cans in the cavities and said powder to elevated temperature and pressure sufficient to consolidate the metal powder into a dense uniform interconnected metal lining on said cavities, and removing excess material and the portion of said can blocking the intersection of the body cavities to complete the desired lined intersecting cavities and to provide communication therebetween.

9. The method of lining a body having a plurality of intersecting cavities including the steps of positioning a thin hollow metal can with a sealed transverse passageway therethrough in one of said cavities and a thin metal tube extending slidably through the sealed transverse passageway of said can in the other of the intersecting cavities, securing said can and said tube to said body within said cavities to provide an interconnected space within said cavities, filling said space with metal powder, evacuating gas from said space, subjecting said body, said can, said tube, and said metal powder to elevated temperature and pressure sufficient to consolidate the metal powder into a dense uniform interconnected metal lining on said cavities, and removing excess material and the portion of the tube extending through said sealed transverse passageway to complete the desired lined intersecting cavities and to provide communication therebetween.

10. The method of lining a body having a plurality of intersecting cavities including the steps of positioning a thin hollow metal can within each of said cavities of said body in spaced relation to the walls of said cavities with at least a portion of one can blocking the intersection of the body cavities, securing said can to said body within each of said cavities to provide an interconnected space within said cavities, filling said space with metal powder, removing gases from said space which would interfere with the subsequent formation of a suitable consolidated metal lining, subjecting said body, the cans in the cavities and said powder to elevated temperature and pressure sufficient to consolidate the metal powder into a dense uniform interconnected metal lining on said cavities, and removing excess material and the portion of said can blocking the intersection of the body cavities to complete the desired line intersecting cavities and to provide communication therebetween.

11. The method of lining a body having a plurality of intersecting cavities including the steps of positioning a thin hollow metal can with a sealed transverse passageway therethrough in one of said cavities and a thin metal tube extending slidably through the sealed transverse passageway of said can in the other of the intersecting cavities, securing said can and said tube to said body within said cavities to provide an interconnected space within said cavities, filling said space with metal powder, removing gases from said space which would interfere with the subsequent formation of a suitable consolidated metal lining, subjecting said body, said can, said tube, and said metal powder to elevated temperature and pressure sufficient to consolidate the metal powder into a dense uniform interconnected metal lining on said cavities, and removing excess material and the portion of the tube extending through said sealed transverse passageway to complete the desired lined intersecting cavities and to provide communication therebetween.

*12. The method of applying a corrosion resistant lining to intersecting passages of a high strength pressure vessel comprising*

*securing and sealing a thin hollow yieldable metal mold in spaced relationship to the passages to be lined to provide an interconnected sealed space lining said passages with at least a portion of said thin hollow metal mold blocking the intersecting passages,*

*removing gases from said space which would interfere with the subsequent formation of a suitable consolidated corrosion resistant lining,*

*filling the space between the passages and the mold with metal powder,*

*subjecting the mold, metal powder and pressure vessel to elevated temperature and pressure sufficient to consolidate the metal powder into a dense uniform interconnected metal lining in the passages, and*

*machining the material in the lined passages to remove the portion of said thin hollow metal mold blocking communication between said passages.*

*13. The method of lining a body having a plurality of intersecting cavities including the steps of*

*positioning a thin hollow metal yieldable mold within the intersecting cavities in spaced relation to the walls of said cavities with at least a portion of said mold blocking the intersection of the body cavities,*

*securing said thin hollow metal mold to said body within said cavities to provide an interconnected space within said cavities,*

*filling said space with metal powder,*

*evacuating gas from said space,*

*subjecting said body, said mold and said powder to elevated temperature and pressure sufficient to consolidate the metal powder into a dense uniform interconnected metal lining said cavities, and*

*removing excess material and the portion of the thin hollow metal mold blocking the intersection of the body cavities to complete the desired lined intersecting cavities and to provide communication therebetween.*

*14. The method of lining a body having a plurality of intersecting cavities including the steps of*

*securing and sealing a thin hollow metal sealed structure within the intersecting body cavities in spaced relation to the walls of the cavities to provide an interconnected sealed space between said structure and the walls of said cavities with at least a portion of the thin hollow metal sealed structure blocking the intersecting cavities,*

*filling said interconnected sealed space with metal powder,*

*evacuating gas from said interconnected sealed space,*

*subjecting the body with the sealed structure and metal powder therein to a temperature of approximately 2100° F. and a pressure of approximately 15,000 psi for a period of approximately two hours to consolidate the metal powder into a dense uniform interconnected lining in said cavities, and*

*machining the lined cavities to the desired dimensions and to remove the portion of the thin hollow metal structure blocking communication between the body cavities.*

*15. The method of applying a corrosion resistant lining to intersecting passages of a high strength pressure vessel comprising*

*securing and sealing a thin hollow yieldable metal mold in spaced relationship to the passages to be lined to provide an interconnected sealed space lining said passages with at least a portion of said thin hollow metal mold blocking the intersecting passages,*

*filling the space between the passages and the mold with metal powder,*

*drawing a vacuum in the space,*

*subjecting the mold, metal powder and pressure vessel to elevated temperature and pressure sufficient to consolidate the metal powder into a dense uniform interconnected metal lining in the passages, and*

*machining the consolidated metal powder and the mold in said passages to remove the portion of the material blocking communicate between said passages.*

* * * * *